US011036333B2

(12) United States Patent
Cho

(10) Patent No.: US 11,036,333 B2
(45) Date of Patent: Jun. 15, 2021

(54) DISTINGUISHING AND TRACKING MULTIPLE OBJECTS WHEN PLACED ON CAPACITIVE TOUCHSCREEN

(71) Applicant: Jacky Cho, Hong Kong (CN)

(72) Inventor: Jacky Cho, Hong Kong (CN)

( * ) Notice: Subject to any disclaimer, the term of this patent is extended or adjusted under 35 U.S.C. 154(b) by 0 days.

(21) Appl. No.: 16/825,184

(22) Filed: Mar. 20, 2020

(65) Prior Publication Data

US 2020/0310642 A1    Oct. 1, 2020

Related U.S. Application Data

(60) Provisional application No. 62/823,735, filed on Mar. 26, 2019.

(51) Int. Cl.
*G06F 3/044* (2006.01)
*G06F 3/041* (2006.01)

(52) U.S. Cl.
CPC ........ *G06F 3/041661* (2019.05); *G06F 3/044* (2013.01)

(58) Field of Classification Search
CPC ...... G06F 3/044; G06F 3/0412; G06F 3/0446; G06F 3/0416; G06F 2203/04103; G06F 3/042; G06F 3/0445; G06F 3/041; G06F 3/0443
See application file for complete search history.

(56) References Cited

U.S. PATENT DOCUMENTS 5,949,060 A * 9/1999 Schattschneider ... G06K 19/067 235/492
9,589,161 B1 3/2017 Lau et al.
9,715,687 B1 * 7/2017 Lau ........................ G06F 3/0443
2012/0188176 A1 * 7/2012 Uzelac .................. G06F 3/0446 345/173
2013/0314349 A1 * 11/2013 Chien ...................... H03G 7/00 345/173

(Continued)

FOREIGN PATENT DOCUMENTS

WO        2012/017205 A2    2/2012

OTHER PUBLICATIONS

International Search Report and Written Opinion of PCT application No. PCT/CN2020/080310 issued from the International Search Authority dated Jun. 23, 2020.

*Primary Examiner* — Olga V Merkoulova
(74) *Attorney, Agent, or Firm* — Spruson & Ferguson (Hong Kong) Limited

(57) ABSTRACT

An algorithm for distinguishing and tracking multiple objects placed on a touchscreen has five steps. Step S1 is to find out candidate patterns from locations of touch points detected on the touchscreen, where the touch points are detected at a certain time instant. Step S2 is to discard invalid (i.e. overlapped) candidate patterns from the candidate patterns obtained in the step S1. Step S3 is to validate and update the geometry of each identified pattern. Step S4 is to update the attributes of identified patterns survived in the step S3. Step S5 is to forecast the geometry of patterns, and display the object. The steps S1-S5 are repeated for a next time instant. In executing the step S1 for the next time instant, the candidate patterns are excluded from any already identified pattern for reducing computation and storage required in executing the step S1.

18 Claims, 11 Drawing Sheets

(56) References Cited

U.S. PATENT DOCUMENTS

| | | | | |
|---|---|---|---|---|
| 2015/0136853 A1* | 5/2015 | Palmer | ............... | G06K 19/067 |
| | | | | 235/451 |
| 2015/0302226 A1* | 10/2015 | Li | ........................ | G06F 3/038 |
| | | | | 235/451 |
| 2016/0358312 A1* | 12/2016 | Kolb | ....................... | G06T 3/40 |
| 2017/0168650 A1* | 6/2017 | Lee | ................ | G02F 1/134309 |
| 2018/0211071 A1* | 7/2018 | Lo | ........................ | G06K 7/081 |

\* cited by examiner

DISTINGUISHING AND TRACKING MULTIPLE OBJECTS WHEN PLACED ON CAPACITIVE TOUCHSCREEN

CROSS-REFERENCE TO RELATED APPLICATIONS

This application claims the benefit of U.S. Provisional Application No. 62/823,735 filed on Mar. 26, 2019, the disclosure of which is hereby incorporated by reference in its entirety.

FIELD OF THE INVENTION

The present invention relates to a technique for distinguishing and tracking a plurality of objects placed on a capacitive touchscreen, where each object produces a plurality of touches at selected touch points detectable by the touchscreen.

BACKGROUND

The present disclosure is concerned with a novel development built on works disclosed in U.S. Pat. Nos. 9,589,161, 9,715,687 and US 2018/0211071. The disclosures of U.S. Pat. Nos. 9,589,161, 9,715,687 and US 2018/0211071 are incorporated herein by reference.

The present disclosure considers a scenario in which multiple cards/objects are placed on a capacitive touchscreen. For illustration, FIG. 1 depicts an example of this scenario. Each object has its own set of anchor points and information points. For details of the anchor points and the information points, see US 2018/0211071. In general, a set of three anchor points creates a triangle or a triangular pattern. The triangular pattern is uniquely identifiable by a touchscreen processor such that the processor can compare the identified pattern against a database of known patterns to detect which object corresponds to the identified pattern. The object can then be identified. The information points are associated with an object. Appearance and disappearance of the information points can be switched over time, and the information points are used by the object to transmit data information from the object to the touchscreen processor. It is desirable to simultaneously identify all the cards/objects and their locations and orientations when they are placed on the touchscreen, based on the collection of touch points that are activated on the touchscreen, viz., that are detected by the touchscreen.

Detecting and distinguishing multiple cards/objects on the touchscreen has a tremendous number of applications for games and educational toys, where such applications require or enable putting multiple objects on the touchscreen to enhance user interaction experience and new functionalities. Such user experience is only achievable on specialized touch tables or touch tablets that belong to one of the following categories.

1. There is a camera overseeing the surface area of the table to identify objects from an aerial perspective.
2. There is a grid of near-field communication (NFC) transceivers embedded underneath the screen, and the gaming pieces are NFC tagged to allow for continuous location detection.
3. There is a camera beneath the surface, looking up and recognizing the optical pattern of objects placed on the surface.
4. There is a grid of infra-red sensors added on the edges of screen to determine the touch location from object's shadow.

However, none of the aforementioned solutions is cost-effective due to the additional hardware components needed in addition to a capacitive touchscreen. There is a need in the art to have a technique for detecting and distinguishing multiple objects on the touchscreen without a need to require additional hardware components apart from the touchscreen.

SUMMARY OF THE INVENTION

The present disclosure provides a method for distinguishing and tracking multiple objects placed on a touchscreen. An individual object is configured to generate imitated touches on the touchscreen.

The method comprises steps (a)-(d).

In the step (a), touch points made on the touchscreen by the objects at a time instant are identified and located.

In the step (b), it is to find out candidate patterns from locations of the touch points. An individual candidate pattern includes three of the touch points forming a triangle congruent to a fingerprint triangle associated with a known predefined object in a set of predefined objects. Said three of the touch points are regarded as three anchor points of the individual candidate pattern.

In the step (c), a set of identified patterns is updated according to the candidate patterns and the locations of the touch points identified in the step (a). An individual identified pattern is used for indicating a detected object on the touchscreen and is assigned with plural touch points generated by the detected object. The touch points assigned to the individual identified pattern include three anchor points for identifying the detected object. Particularly, the set of identified patterns is updated by an updating process. The updating process comprises incorporating a subset of the candidate patterns into the set of identified patterns. The subset is selected such that in the subset, each anchor point belongs to one and only one candidate pattern for avoiding a single anchor point from being shared by plural candidate patterns. The updating process further comprises purging the set of identified patterns of any identified pattern that is invalid. An invalid identified pattern is defined to have no more than one anchor point coinciding with any of the touch points identified in the step (a).

In the step (d), processing steps are repeated for a next time instant. The processing steps include the steps (a)-(c). In executing the step (b) for the next time instant, preferably and advantageously, any touch point identified in the step (a) and coinciding with any assigned touch point in the set of identified patterns determined for the time instant is excluded from consideration in finding out the candidate patterns. It advantageously leads to a reduction in required computation and storage when compared to execution without a knowledge of the set of identified patterns.

Preferably, the updating process further comprises creating a point set of the individual candidate pattern based on locations of the three anchor points of the individual candidate pattern. The point set is a bounded area representing a size and an orientation of the known predefined object. The bounded area may be a circle or any other shape. The bounded area may also be a triangle, a quadrilateral or a polygon.

In the updating process, the subset of the candidate patterns is selected by a selecting process. Preferably, the selecting process comprises: initializing the subset to be a null set; sequentially examining the candidate patterns one by one to determine whether a candidate pattern under examination is invalid; and responsive to finding that the candidate pattern under examination is not invalid, including the candidate pattern under examination into the subset. An invalid candidate pattern is defined such that any anchor point of the invalid candidate pattern is shared, or is already used, by any identified pattern in the set of identified patterns or by any candidate pattern already included in the subset.

In sequentially examining the candidate patterns, preferably the candidate patterns are arranged in an ascending order of degrees of pattern overlapping. A respective degree of pattern overlapping of the individual candidate pattern is computed by summing three numbers each being a total number of respective point sets that an individual anchor point of the individual candidate pattern is enclosed by.

Preferably, the purging of the set of identified patterns comprises: validating a respective touch point assigned to the individual identified pattern by verifying if the respective touch point is one of the touch points identified in the step (a) and is enclosed by the point set of the individual identified pattern; and responsive to finding that the respective touch point is invalid, remove the respective touch point from the identified pattern.

In the updating process, it is preferable to determine whether the individual identified pattern is incomplete. An incomplete identified pattern is defined to have only two anchor points coinciding with the touch points identified in the step (a) such that the incomplete identified pattern has a missing anchor point. It is also preferable that responsive to finding that the individual identified pattern is incomplete, a location of the missing anchor point of the individual identified pattern from the two coinciding anchor points thereof is estimated such that the individual identified pattern is re-assigned with three anchor points.

After the incorporating of the subset into the set of identified patterns and after the purging of the set of identified patterns are performed, preferably the updating process performs allocating remaining touch points identified in the step (a) and not assigned as anchor points in the set of identified patterns to different identified patterns as information points according to respective point sets of the different identified patterns and locations of the remaining touch points.

After the remaining touch points are allocated, preferably the updating process performs updating attributes of the individual identified pattern according to data received through any information point allocated to the individual identified pattern.

After the incorporating of the subset into the set of identified patterns and after the purging of the set of identified patterns are performed, preferably the updating process performs computing or updating a geometry of the individual identified pattern according to locations of the three anchor points of the individual identified pattern. The geometry of the individual identified pattern comprises a reference point of the individual identified pattern on the touchscreen and an orientation of the individual identified pattern with respect to the touchscreen.

Optionally, the method further comprises a step (e). In the step (e), a trajectory of the individual identified pattern is forecasted such that respective trajectories of on-screen icons tracking the objects are displayable on the touchscreen in advance for compensating for latency of the touchscreen. In the step (d), the processing steps further include the step (e).

The trajectory of the individual identified pattern may be forecasted by a forecasting process. In the forecasting process, a time series of respective geometries of the individual identified pattern over a plurality of different time instants is obtained. The plurality of different time instants includes the time instant. A linear regression technique is then used to estimate a future geometry of the individual identified pattern based on the time series of respective geometries of the individual identified pattern such that the trajectory of the individual identified pattern is forecasted. The linear regression technique may be a polynomial-based linear regression technique.

The present disclosure also provides an apparatus comprising a touchscreen and one or more processors. The touchscreen is controllable by the one or more processors to sense touches made on the touchscreen. The one or more processors is configured to execute a process for distinguishing and tracking multiple objects placed on the touchscreen according to any of the embodiments of the method, where an individual object is configured to generate imitated touches on the touchscreen.

In addition, the present disclosure provides a non-transitory computer readable medium storing a program. The program, when executed on one or more processors, causes the one or more processors to execute a process for distinguishing and tracking multiple objects placed on a touchscreen according to any of the embodiments of the method, where an individual object is configured to generate imitated touches on the touchscreen.

Other aspects of the present disclosure are disclosed as illustrated by the embodiments hereinafter.

DETAILED DESCRIPTION

Figure 1:
FIG. 1 is a photograph of multiple objects placed on a touchscreen of a computing device, showing that the user can interact with the computing device by placing the objects on particularly selected locations on the touchscreen.

Provided herein is a method for distinguishing multiple objects placed on a capacitive touchscreen and tracking the objects on the touchscreen. The method is illustrated by first describing a computer-implemented algorithm for distinguishing and tracking the objects placed on the touchscreen. The algorithm is a practical realization of an exemplary embodiment of the disclosed method. Details of the method are further elaborated by generalizing the disclosed algorithm.

A system model and variables used herein are described as follows. Let M be the number of touch points activated on the screen at any time instant. That is, M touch points are detected on the screen at the aforesaid time instant. It is desired to determine the number of objects placed on the screen and to distinguish these objects according to the activated touch points that are detected by a touchscreen processor. Let N be the actual number of objects placed on the screen. Since one object contains three anchor points and possibly includes one or more information points, it follows that N is upper bounded by M/3. That is, N≤M/3. Denote P as an object pattern (or a pattern in short), which is a set of points representing an object O. Let $\{a_1, a_2, a_3\}$ be anchor points of P. Let $\{A_1, A_2, A_3\}$ be the anchor point triangle of P, where the anchor point triangle is a unique predefined shape such that no other 3 points in P except $\{a_1, a_2, a_3\}$ can form a triangle congruent to the triangle formed by $\{A_1, A_2, A_3\}$. That is, $$\forall \{p,q,r\} \in P, \Delta pqr \cong \Delta A_1 A_2 A_3 \Leftrightarrow p=a_1, q=a_2 \text{ and } r=a_3,$$

where: Δ pqr stands for a triangle formed by the three points p, q and r on the touchscreen; and "≅" means "congruent to". The anchor point triangle of P is also named as a fingerprint triangle, because the fingerprint triangle is associated with the represented object O and is thus useful for object identification. Let $\{x, y, \theta\}$ be the geometry of P, where (x, y) is the location of a certain pre-determined reference point of P on the screen, and θ is an orientation of P with respect to the screen. Conveniently, the pre-determined reference point may be a certain anchor point of P. The orientation θ may be defined as an angle of rotation about the reference point (x, y) from a horizontal axis of the screen to a longest side of Δ $a_1 a_2 a_3$ connecting to the reference point. In one practical choice, $a_1$, $a_2$ and $a_3$ may be arranged in an anticlockwise sense with the side $a_1 a_2$ being the longest side of Δ $a_1 a_2 a_3$. The reference point (x, y) may be selected to be $a_1$, so that the orientation θ can be determined from the side $a_1 a_2$ and the horizontal axis of the screen. The anchor-point locations of Δ $a_1 a_2 a_3$ are usable to calculate $\{x, y, \theta\}$, which is the geometry of the represented object O. Note that for unique, unambiguous determination of the geometry, the three sides of the fingerprint triangle are required to be mutually different. Hence, the fingerprint triangle of the object O shall not be an isosceles triangle or an equilateral triangle.

Figure 2:
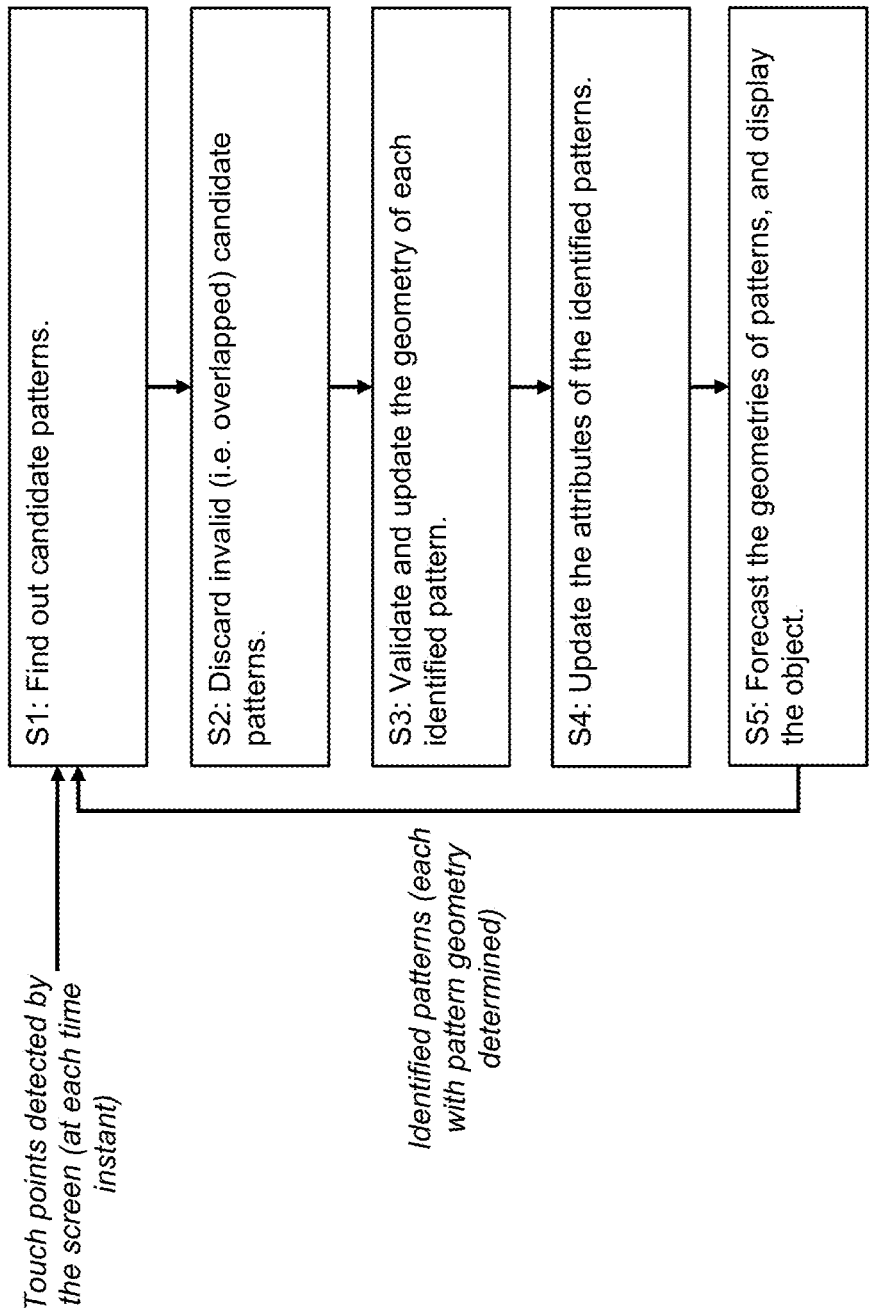
FIG. 2 depicts a flowchart showing a process flow of an algorithm for exemplarily illustrating a disclosed method for distinguishing and tracking multiple objects placed on a touchscreen.

The disclosed algorithm is illustrated with the aid of FIG. 2, which depicts a process flow of the algorithm. As shown in FIG. 2, the algorithm is executed as a loop, where the loop includes a sequence of operation steps. The sequence of operation steps is executed for a set of M touch points detected by the screen at one time instant. By executing the algorithm as the loop, the sequence of operation steps is repeated for respective sets of touch points obtained over consecutive time instants. The numbers of touch points obtained at different time instants are most likely different because new objects may be put on or withdrawn from the screen. Furthermore, erroneous detection of a touch point that is actually non-existent (viz., false positive) by the touchscreen electronics/processors occasionally occurs. At the end of executing the sequence of processing steps, a set of identified patterns is obtained. Each identified pattern includes pattern-related data such as the pattern's geometry. The set of identified patterns is updated by recursively repeating the sequence of operation steps each time with a new set of detected touch points. The algorithm includes steps S1 to S5.

In the step S1, it is to find out candidate patterns from the M detected touch points. Exemplarily, the step S1 is illustrated by the following pseudo codes.

S1.1. For every set of three touch points $\{p_1, p_2, p_3\}$ on the screen where the three touch points are not yet assigned to any pattern, do:

S1.1.1. if Δ $p_1 p_2 p_3 \cong$ Δ $A_1 A_2 A_3$, then:

S1.1.1.1. create a candidate pattern $P_i'$;

S1.1.1.2. set $p_1 = a_{1i}$, $p_2 = a_{2i}$ and $p_3 = a_{3i}$.

Practically, the screen has a finite resolution in resolving different touch points. Therefore, the location of a touch point is an estimated one and may be a little bit off from the actual location. In implementing the step S1.1.1, it is desirable to take into consideration the finite resolution of the screen in assessing whether Δ $p_1 p_2 p_3$ is congruent to Δ $A_1 A_2 A_3$. For example, Δ $p_1 p_2 p_3$ may be determined to be congruent to Δ $A_1 A_2 A_3$ if a percentage error in length between the side $p_m p_n$ and the side $A_m A_n$ is less than a tolerable error for (m, n)=(1,2), (1,3) and (2,3). The tolerable error may be, e.g., 10%.

Note that a knowledge of screen resolution is required for determining whether Δ $p_1 p_2 p_3$ is congruent to Δ $A_1 A_2 A_3$. In case the screen resolution or the screen size is not known, a triangle Δ $p_1 p_2 p_3$ similar to Δ $A_1 A_2 A_3$ with a scaling factor within a predetermined small range is identified. It is then assumed that Δ $p_1 p_2 p_3$ is congruent to Δ $A_1 A_2 A_3$ so as to create a candidate pattern. Whether Δ $p_1 p_2 p_3$ is truly congruent to Δ $A_1 A_2 A_3$ is to be verified in a later stage with side information such as a location of an information point assigned to the candidate pattern.

As a result of executing the step S1, it forms N' candidate patterns, where N'≥N. These N' candidate patterns will be individually assessed in subsequent steps to find out which N out of N' candidate patterns belong to the actual objects on the screen.

Figure 3:
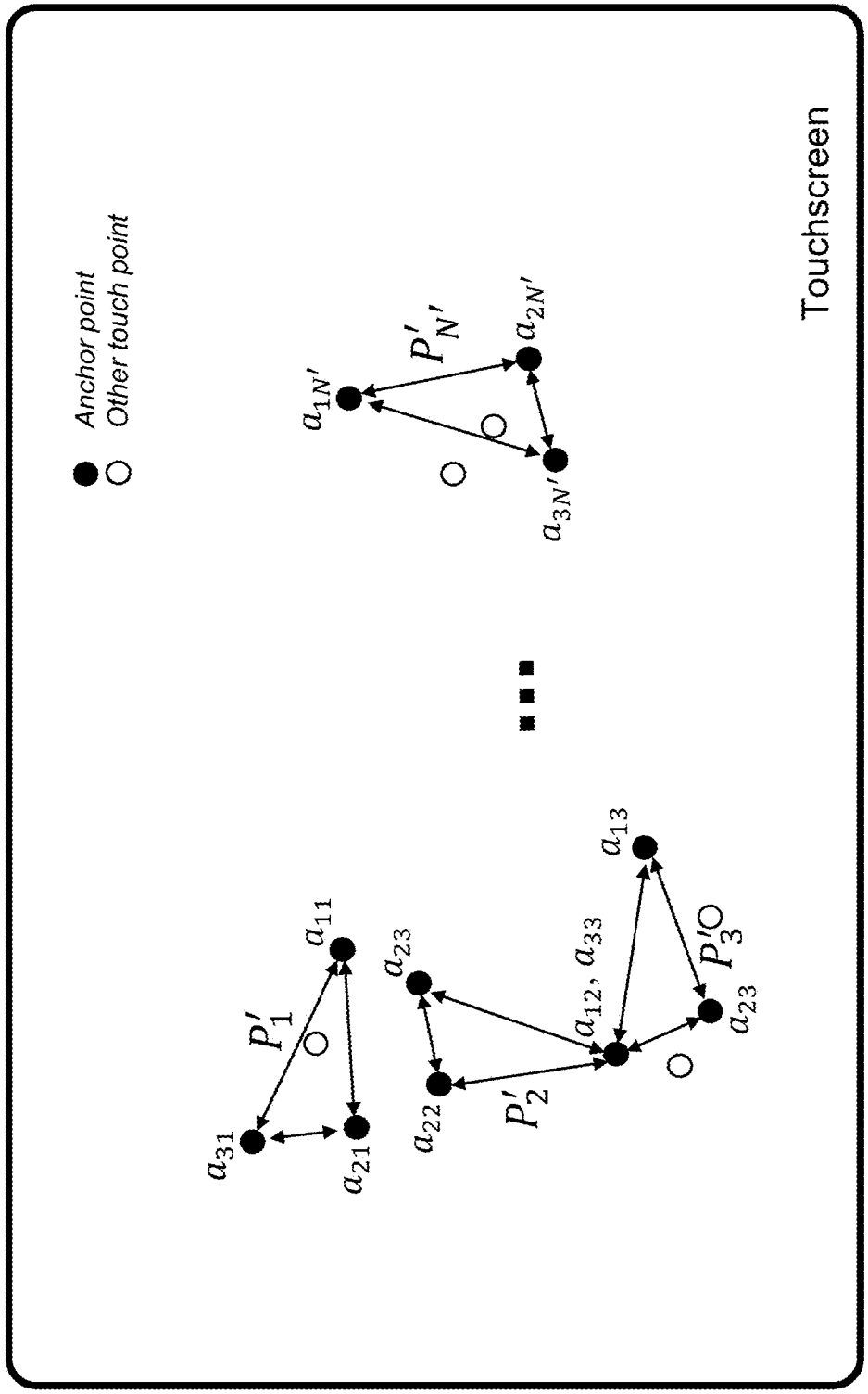
FIG. 3 depicts an example of creating a plurality of candidate patterns from a plurality of touch points by performing step S1 of the algorithm.

FIG. 3 depicts an example of creating a plurality of candidate patterns from a plurality of touch points by performing the step S1. Note that one touch point may be shared by different patterns, resulting in overlapped patterns. Overlapped patterns are clearly not valid; otherwise one touch point on the screen would have been created by at least two physical objects. Overlapped patterns are required to be removed in subsequent steps.

In the step S2, it is to discard invalid (i.e. overlapped) candidate patterns from the N' candidate patterns. Exemplarily, the step S2 is illustrated by the following pseudo codes with the aid of FIGS. 4 and 5.

S2.1. For every candidate pattern $P_i'$, do:

S2.1.1. create the point set $C_i$, a circle that represents the pattern $P_i'$;

S2.2. For every candidate pattern $P_i'$, do:

S2.2.1. let $S_i$ be the total sum of number of circles that every anchor point of $P_i$, is enclosed by, i.e. $S_i=\Sigma_{k=1}^{3}|\{C_j|a_{ki}\in C_j \forall j\in[1 \ldots N']\}|$ where $|\cdot|$ stands for "the number of";

S2.3. Sort the candidate patterns in an ascending order of $S_i$;

S2.4. For every candidate pattern $P_i'$ arranged in an ascending order of $S_i$, do:
  S2.4.1. if all points in $\{a_1, a_2, a_3\}_i$ are not assigned to any identified pattern, then:
    S2.4.1.1. create an identified pattern $P_i$;
    S2.4.1.2. assign $\{a_1, a_2, a_3\}_1$ to $P_i$;
  S2.4.2. otherwise:
    S2.4.2.1. discard $P_i$.

In the step S2.1.1, $C_i$ is created as a circle with a predefined size and position with respect to the anchor points of $P_i'$. Since a pattern is associated with a physical object in practice, and since the boundary and dimension of the object are known, the size of the circle $C_i$ can be determined. For example, one may set $C_i$ to be a circle with a diameter of 5 cm and a center selected to be a mid-point between first and second anchor points of $P_i'$. The circle is only one implementation option of a bounded area that represents a size and an orientation of a known predefined object. Apart from the circle, other realizations of the bounded area used for $C_i$ include a rectangle, a triangle, a quadrilateral, a polygon, etc.

In the step S2.3, all the N' candidate patterns are first arranged in the ascending order of $S_i$. Then the arranged sequence of N' candidate patterns are one-by-one processed by the steps S2.4.1 (including S2.4.1.1 and S2.4.1.2) and S2.4.2 (including S2.4.2.1).

Figure 4:
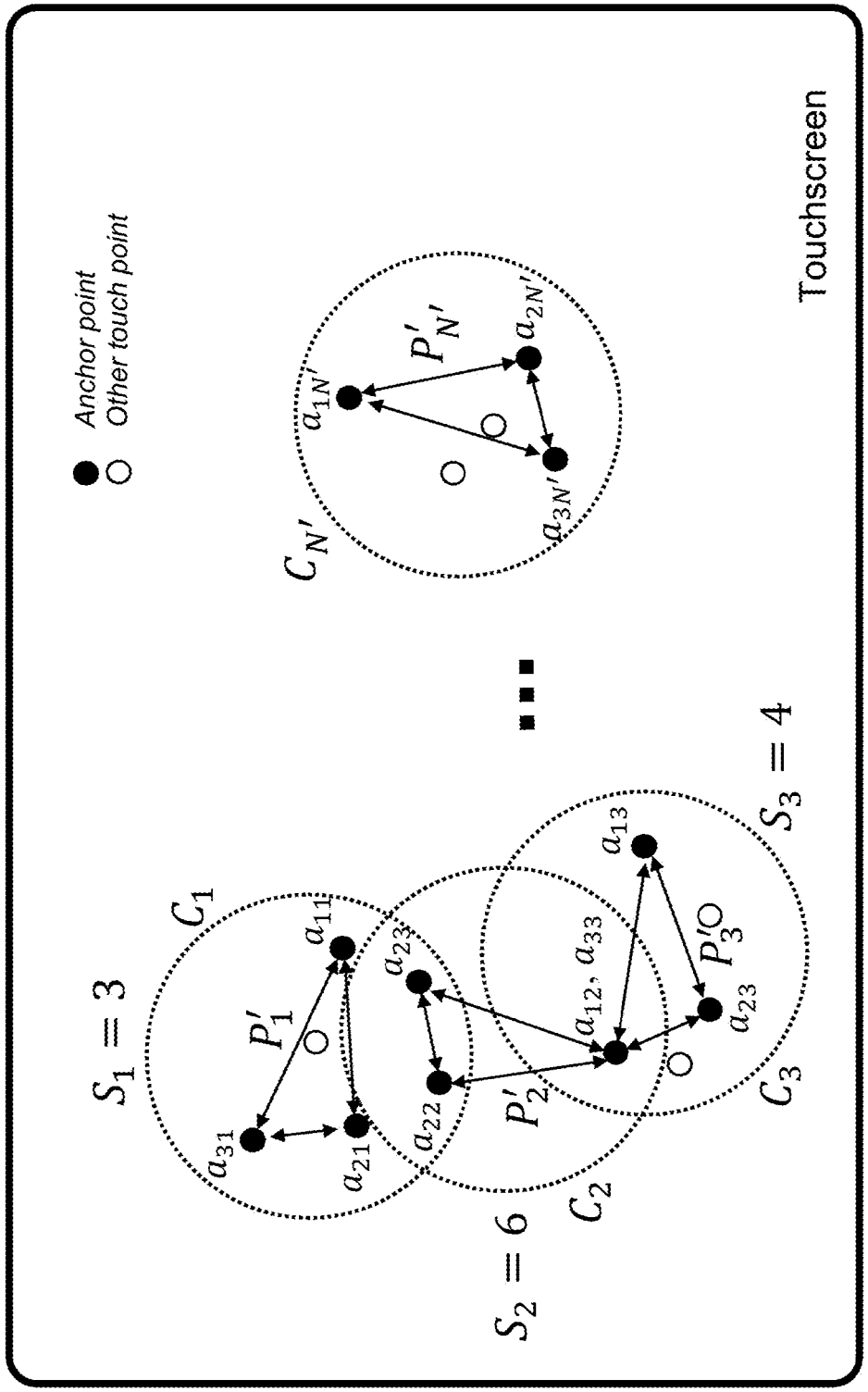
FIG. 4 depicts the creation of point sets (shown as circles) after step S2.1 is performed, showing that overlapping of circles is present where the overlapped circles are considered invalid circles and should be discarded.
Figure 5:
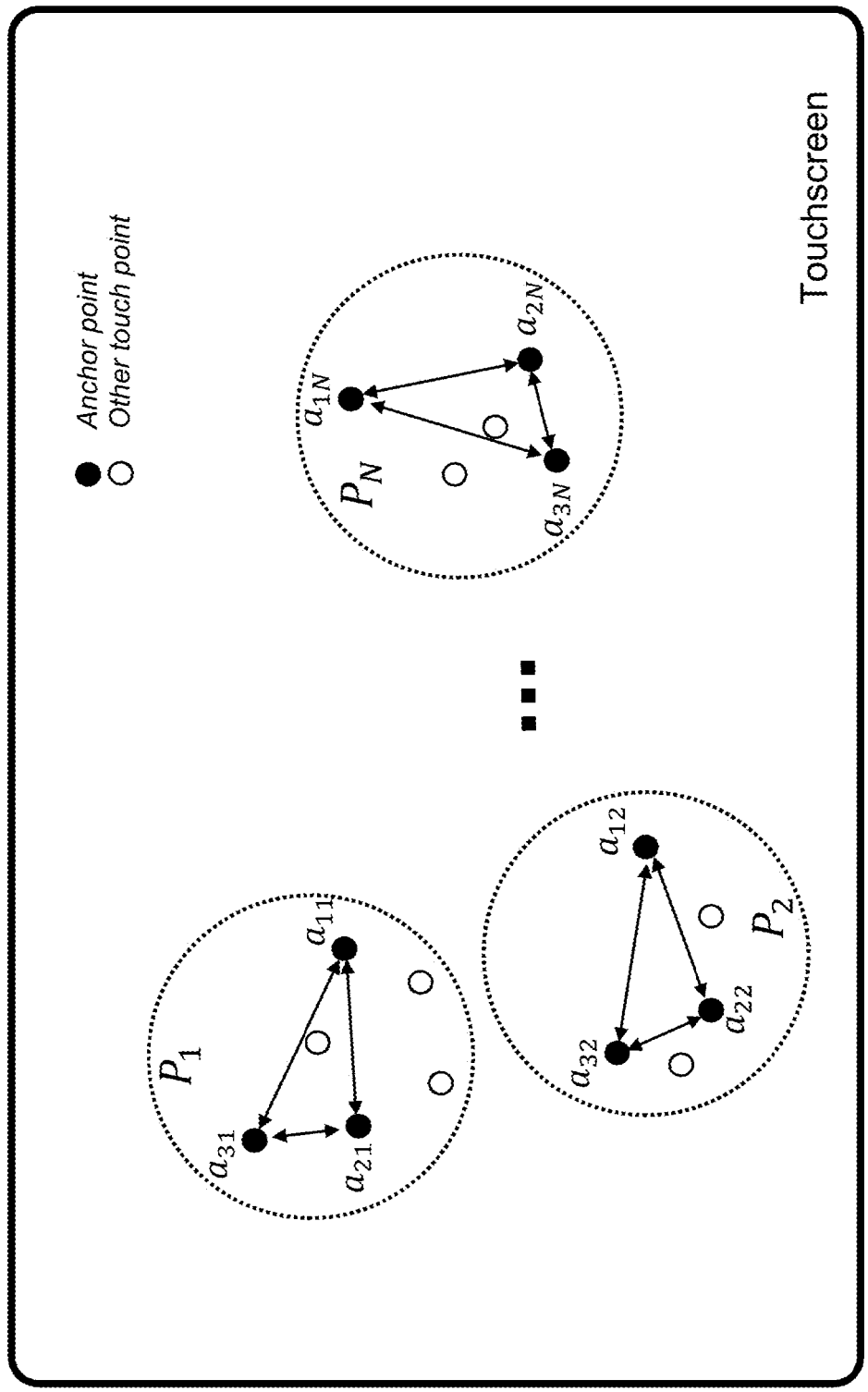
FIG. 5 depicts a plurality of identified patterns after the whole step S2 of the algorithm is completed, showing that any overlapped circle is removed.

An advantage of the above-listed procedure is that it ensures a maximum number of non-overlapped patterns to be identified. FIG. 4 depicts the creation of point sets (shown as circles) after the step S2.1 (including the step S2.1.1) is performed. Note that overlapping of the circles is present. FIG. 5 depicts a plurality of identified patterns after the step S2 is completed, showing that any overlapped circle is removed.

In the step S3, it is to validate and update the geometry of each identified pattern. Exemplarily, the step S3 is illustrated by the following pseudo codes.

S3.1. For every identified pattern $P_i$, do:
  S3.1.1. for every touch point that has been assigned to $P_i$, do:
    S3.1.1.1. if the touch point under consideration does not exist or is not enclosed by $C_i$, then:
      S3.1.1.1.1. remove the touch point under consideration from $P_i$;
S3.2. For every identified pattern $P_i$, do:
  S3.2.1. if none or only 1 touch point of $\{a_1, a_2, a_3\}_i$ exists, then:
    S3.2.1.1. discard $P_i$;
  S3.2.2. otherwise
    S3.2.2.1. if only 2 of $\{a_1, a_2, a_3\}_i$ exist, then:
      S3.2.2.1.1. predict the position of the missed anchor point with the existing 2 anchor points;
    S3.2.2.2. if $\Delta\ a_{1i}a_{2i}a_{3i} \not\cong \Delta\ A_1A_2A_3$, then:
      S3.2.2.2.1. discard $P_i$;
    S3.2.2.3. otherwise
      S3.2.2.3.1. update $\{x, y, \theta\}_i$ and $C_i$.

In the step S3.1.1.1, that "the touch point under consideration does not exist" means that this touch point as assigned to $P_i$ is not found from the currently-considered M detected touch points (detected by the screen).

In the step S3.2.2.2, "$\not\cong$" means "not congruent to".

The above-listed procedure results in eliminating any identified pattern that fails to have enough anchor points to determine its represented object's geometry, or that is found to be a false positive result created in the step S2.

In the step S4, it is to update the attributes of identified patterns survived in the step S3. Exemplarily, the step S4 is illustrated by the following pseudo codes.

S4.1. For every detected touch point $p_k$ that has not been assigned to any pattern, do:
  S4.1.1. if $p_k$ is enclosed by any $C_i$, then:
    S4.1.1.1. assign $p_k$ to $P_i$;
  S4.1.2. if $P_i$ is missing with 1 anchor point and $\Delta\ \{p_k, a_{mi}, a_{ni}\} \cong \Delta\ A_1A_2A_3$, then:
    S4.1.2.1. set $p_k$ as the missed anchor point;
  S4.1.3. otherwise
    S4.1.3.1. set $p_k$ as an information point of $P_i$;
S4.2. For every identified pattern $P_i$, do:
  S4.2.1. update its attributes (e.g., ID) according to its information points.

The attributes of a pattern can be used to identify which physical object is placed on the screen, and different user interface (UI) response can be provided.

At the completion of the step S4.1, the set of identified patterns has been updated.

In the step S5, it is to forecast the geometry of patterns, and display the object. For the sake of convenience and without loss of generality, consider that the current time instant is zero. Let previous time instants be $\Delta T_{-1}$, $\Delta T_{-2}$, etc. Exemplarily, the step S5 is illustrated by the following pseudo codes.

S5.1. For every identified pattern $P_i$, do:
  S5.1.1. find the time series of $P_i$, and the corresponding geometries $\{x, y, \theta\}_i^T$, where $T=\{\Delta T_{-t+1}, \Delta T_{-t+2}, \ldots, \Delta T_{-1}, 0\}$ and t is the maximum sample size of the time series.
  S5.1.2. perform a polynomial-based linear regression analysis with T as a predictor and $\{x, y, \theta\}_i^T$ as a response, i.e. $\{x, y, \theta\}_i^T = \vec{\beta} T + \vec{\varepsilon}$;
  S5.1.3. estimate $\{x, y, \theta\}_i^{\Delta T_j}$, where $\Delta T_1$ is a future time instant;
  S5.1.4. display, on the touchscreen, a visual notification of object $O_i$ with the geometry $\{x, y, \theta\}_i^{\Delta T_j}$.

In the step S5.1.2, it is possible that other linear-regression techniques may be used.

Figure 6:
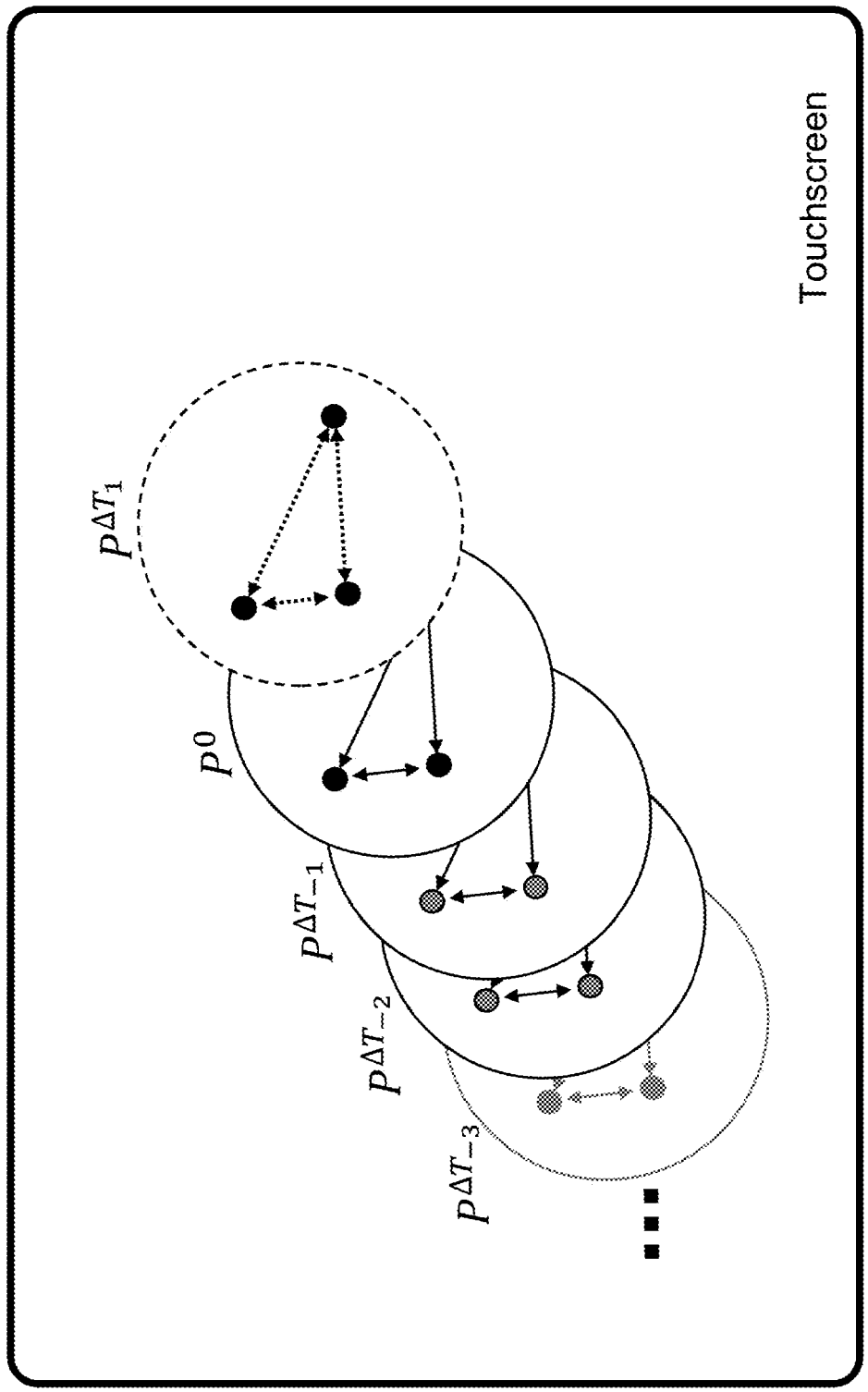
FIG. 6 depicts an example for pictorially illustrating prediction of movement of an identified pattern on the touchscreen by performing the step S5 of the algorithm.

Displaying the object with a predicted future geometry is capable of compensating for the latency of the touchscreen, thus creating a more responsive output. FIG. 6 provides an example for pictorially illustrating the above-mentioned procedure.

An aspect of the present disclosure is to provide a method for distinguishing and tracking multiple objects placed on a capacitive touchscreen. The method is a generalization of the above-described algorithm. An individual object is configured to generate imitated touches on the touchscreen, and the touchscreen is configured to sense the imitated touches. Respective locations and orientations of the objects on the touchscreen are determined. Furthermore, the objects are tracked such that future location and orientation of the individual object are predicted. The predicted location and orientation are useful for practical applications in which, e.g., an on-screen icon following the individual object is intended to be displayed in advance through some visual animation.

Figure 7:
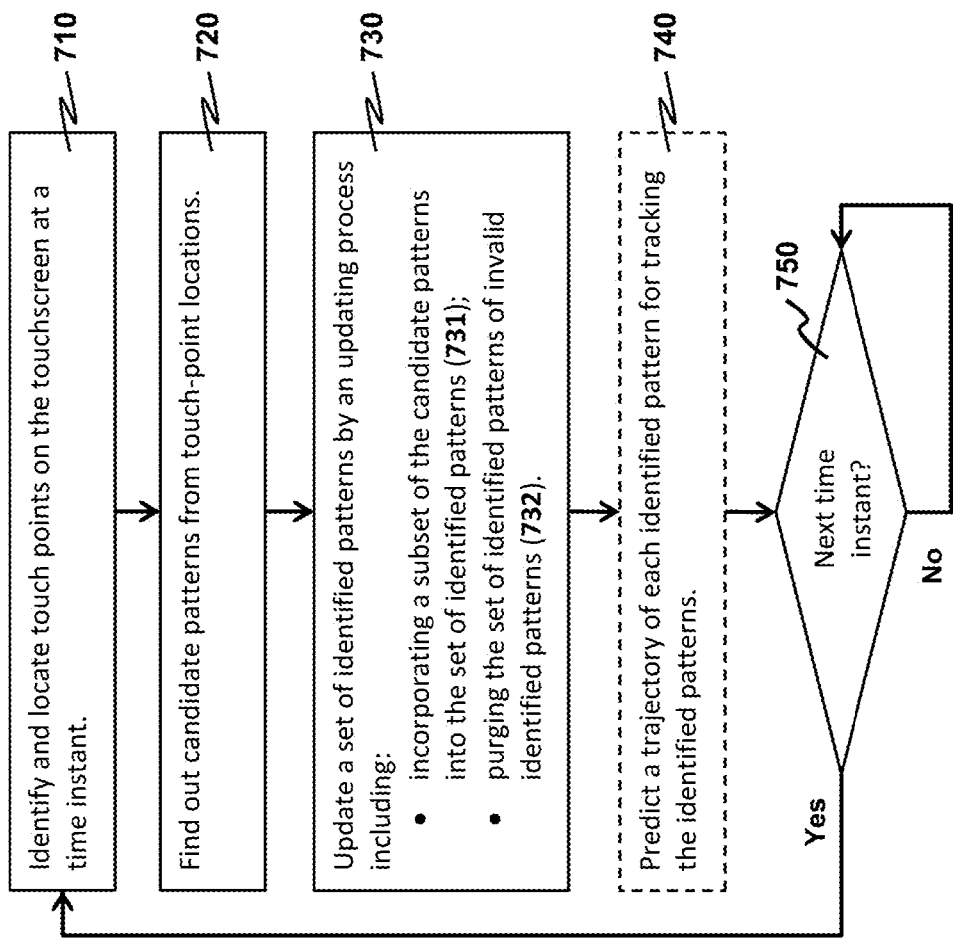
FIG. 7 depicts a flow of exemplary processing steps as used in the disclosed method.

Exemplarily, the method is illustrated with the aid of FIG. 7. FIG. 7 depicts a flow of exemplary processing steps as used in the disclosed method.

In a step 710, touch points made at a time instant on the touchscreen by the objects are identified and located. For convenience and without loss of generality, this time instant is referred to as a present time instant.

Candidate patterns are then identified in a step 720. In particular, the candidate patterns are created and determined from locations of the touch points identified in the step 710. An individual candidate pattern includes three of the touch points forming a triangle congruent to a fingerprint triangle associated with a known predefined object in a set of predefined objects. The aforesaid three of the touch points are regarded as three anchor points of the individual candidate pattern. The step 720 is realizable by the step S1 of the algorithm.

After the candidate patterns are determined, a set of identified patterns is updated in a step 730 according to the candidate patterns and the locations of the touch points identified in the step 710. An individual identified pattern is used for indicating a detected object on the touchscreen and is assigned with plural touch points generated by the detected object. The touch points assigned to the individual identified pattern include three anchor points for identifying the detected object.

Particularly, the set of identified patterns is updated by an updating process. The updating process is at least arranged to incorporate a subset of the candidate patterns into the set of identified patterns (step 731), and to purge the set of identified patterns of any identified pattern that is invalid (step 732). The selection of the subset of the candidate patterns is made such that in the subset, each anchor point belongs to one and only one candidate pattern for avoiding a single anchor point from being shared, or used, by plural candidate patterns. An invalid identified pattern is defined to have no more than one anchor point coinciding with any of the touch points identified in the step 710. The step 730 is realizable by the steps S2 and S3 of the algorithm, and optionally by the step S4 thereof.

The rationale of defining the invalid identified pattern by the aforementioned criterion is as follows. If no anchor point assigned to the individual identified pattern coincides with any detected touch point identified in the step 710, it is almost sure that the object associated with the individual identified pattern has been moved away from its previously detected position. If there is only one such anchor point, it is also likely that the object has been moved away from the previously detected position. However, if there are two assigned anchor points coinciding with some detected touch points identified in the step 710, it is likely that the remaining assigned anchor point is not successfully detected so that the object is not actually moved away. If the object has been moved away from its previously recorded position, the individual identified pattern associated with the object is outdated, and should be removed from the set of identified patterns. Conversely, if the object is still intact on the previously recorded position, the individual identified pattern is still informative and can be retained in the set of identified patterns.

In a step 750, the steps 710, 720 and 730 are repeated for a next time instant. In executing the step 720 for the next time instant, it is highly preferable that any touch point identified in the step 710 and coinciding with any assigned touch point in the set of identified patterns determined for the present time instant is excluded from consideration in finding out the candidate patterns. Advantageously, it results in a reduction of required computation and storage when compared to execution of the step 720 without a knowledge of the set of identified patterns. The exclusion of the touch points already assigned to any identified pattern is also implemented in the step S1.1 of the algorithm.

The significance and advantage of this reduction in computation and storage is further elaborated as follows. It is first noticed that each object placed on the touchscreen has three anchor points and possibly one or more information points. Furthermore, multiple objects are placed on the touchscreen. A large number of touch points may be detected in the step 710. As it is required to check each triangle formed by three of the detected touch points, the number of triangles to be tested is huge. For illustration, consider an example scenario that each object generates 4 touch points. If there are two objects on the touchscreen, the number of triangles to be tested is given by $8!/(5!\times 3!)=56$. Similarly, if there are three and four objects on the touchscreen, the numbers of triangles to be tested are $12!/(9!\times 3!)=220$ and $16!/(13!\times 3!)=560$, respectively. The increase in the number of triangles to be tested increases sharply and nearly-exponentially as the number of objects placed on the touchscreen increases. It severely burdens the computing device, such as a tablet computer, that performs the computation to distinguish different objects. If, on the other hand, already-assigned touch points are excluded from consideration in finding out the candidate patterns, a significant reduction in computation results. Consider a typical example that only one of the objects placed on the touchscreen is moved between successive time instants of touch sensing. The number of triangles to be tested is only $4!/(1!\times 3!)=4$ regardless of the number of objects placed on the touchscreen. The significant reduction in required computation and storage enables distinguishing and tracking multiple objects on the touchscreen to be practically implementable on typical computing devices.

Figure 8:
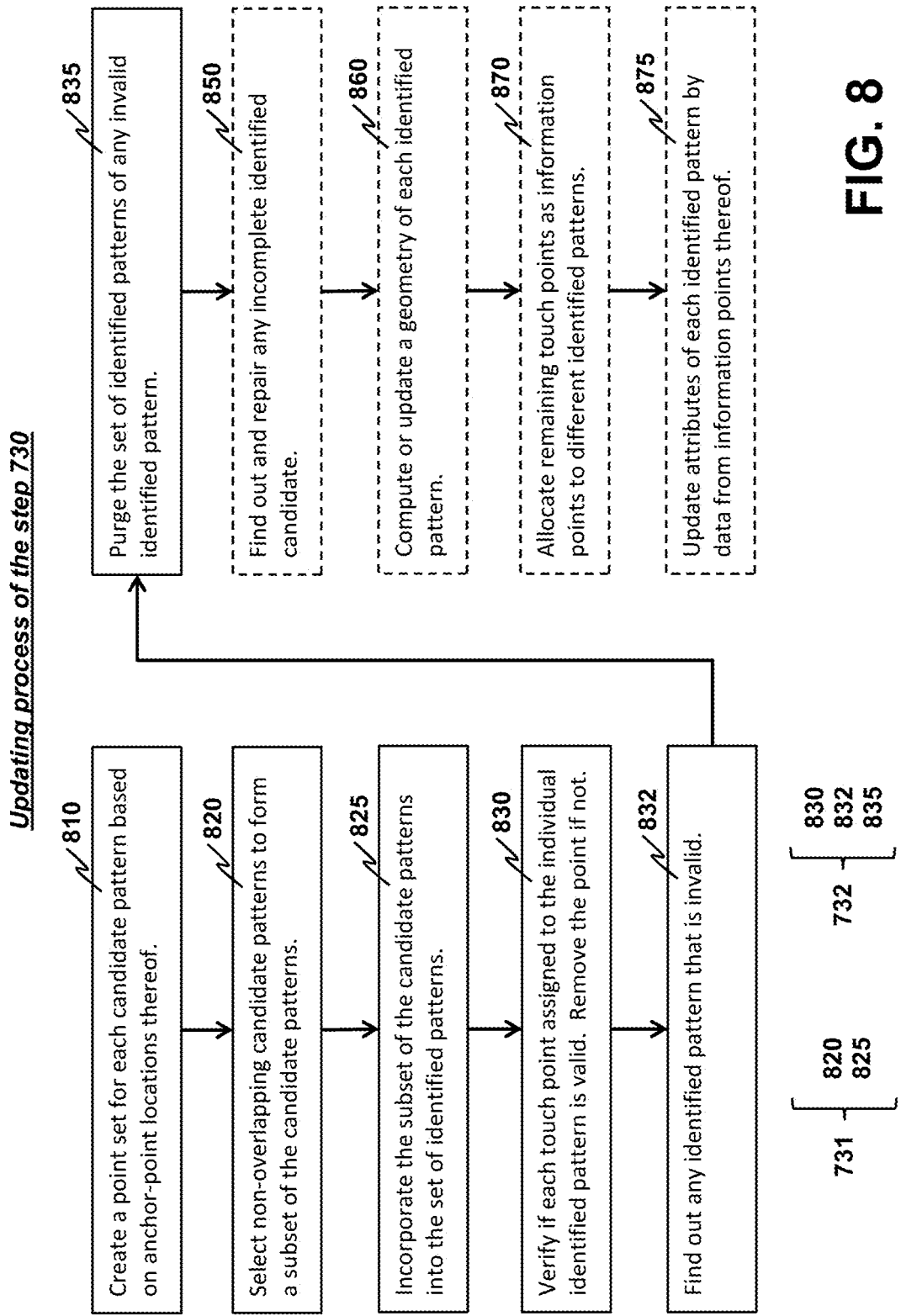
FIG. 8 depicts a flowchart showing exemplary steps of an updating process for updating the set of identified patterns in accordance with certain embodiments of the disclosed method.

The updating process as used in the step 730 is further illustrated as follows with the aid of FIG. 8. FIG. 8 depicts a flowchart showing exemplary steps taken by the updating process in updating the set of identified patterns.

In a step 810, a point set of the individual candidate pattern based on locations of the three anchor points of the individual candidate pattern is created. The point set is a bounded area representing a size and an orientation of the known predefined object. The step 810 is realizable by the step S2.1 of the algorithm.

The bounded area may be shaped according to the shape of the known predefined object. For example, the bounded area may be shaped as a circle, a rectangle, a triangle, a quadrilateral, a polygon, etc. Conveniently, the bounded area is preferably set as a circle because only two parameters, i.e. center and radius of the circle, are required to specify the circle. Since the three anchor-point locations and the boundary of the known predefined object are known, generally the center and radius of the circle can be easily determined. Those skilled in the art may also design each object in the set of predefined objects with a constraint between the center of the object and the set of three anchor points. One example of the constraint is that the center of the object coincides with a centroid of the fingerprint triangle formed by the three anchor points. Another example is that the center of the object coincides with a mid-point of the longest side of the fingerprint triangle.

Figure 9:
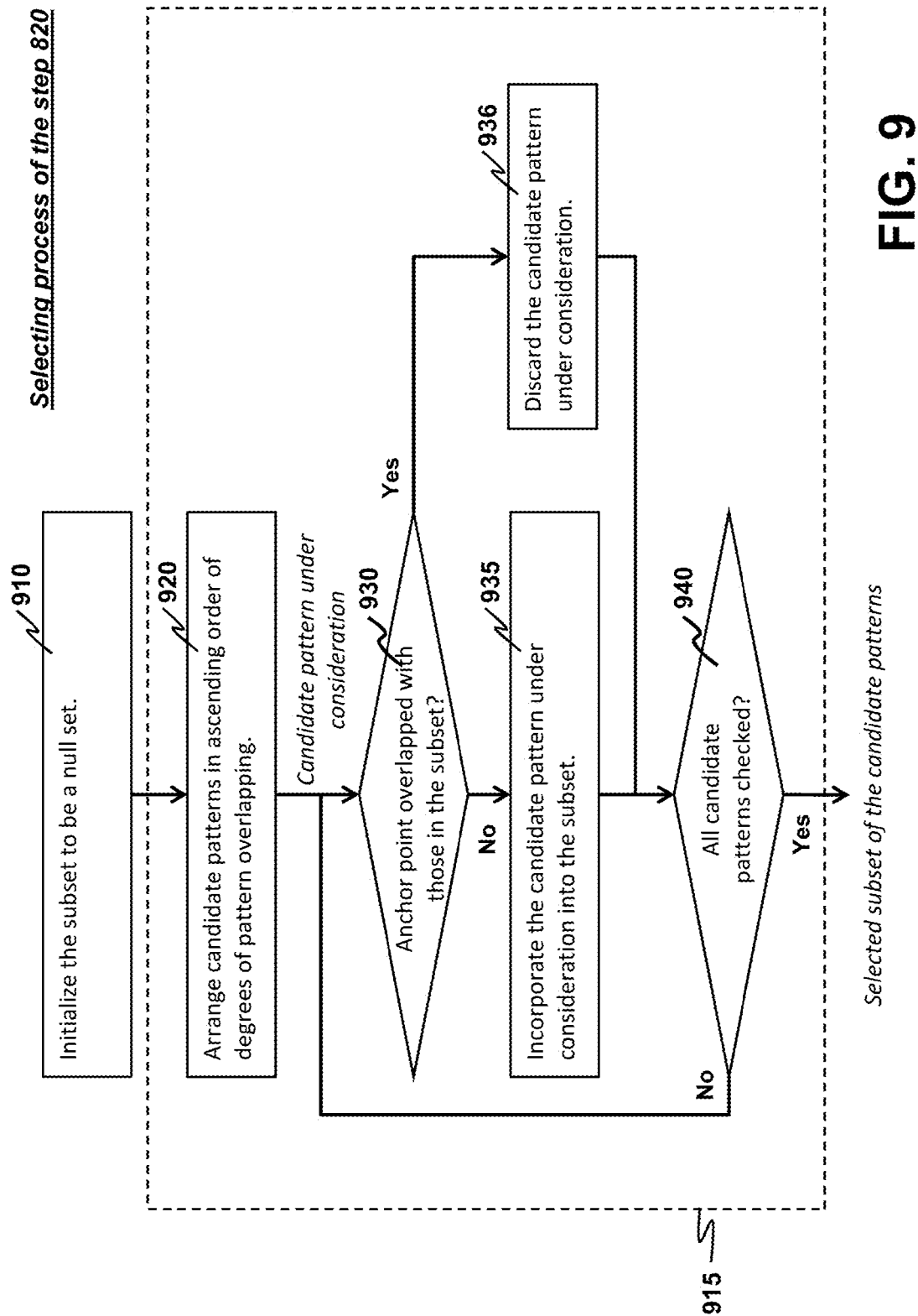
FIG. 9 depicts exemplary steps of a selecting process for selecting candidate patterns to be incorporated into the set of identified patterns in accordance with certain embodiments of the disclosed method.

In a step 820, the subset of the candidate patterns is selected by a selecting process. The steps are realizable by the steps S2.2-S2.4 of the algorithm. FIG. 9 depicts exemplary steps of the selecting process. In the selecting process, the subset is gradually added up with acceptable candidate patterns by one-by-one examining the candidate patterns. Initially, the subset is initialized to be a null set, i.e. an empty set (step 910). The candidate patterns are sequentially examined one by one to determine whether a candidate pattern under examination is invalid, whereby the candidate pattern under examination, if found to be not invalid, is included into the subset (step 915). An invalid candidate pattern is defined such that any anchor point of the invalid candidate pattern is shared, or is already used, by any identified pattern in the set of identified patterns or by any candidate pattern already included in the subset. The rationale behind such definition is that valid candidate patterns are to be included into the set of identified patterns, and different identified patterns are non-overlapping.

The step 915 may be implemented as follows. The candidate patterns are first arranged in an ascending order of degrees of pattern overlapping (step 920). A respective degree of pattern overlapping of the individual candidate pattern is computed by summing three numbers. Each of these three numbers is given by a total number of respective point sets that an individual anchor point of the individual candidate pattern is enclosed by. The candidate patterns are one-by-one examined in the aforementioned ascending order. If the candidate pattern under examination is not invalid (step 930), the candidate pattern under examination is added to the subset (step 935) such that the subset is expanded. In case the candidate pattern under examination is found to be invalid (the step 930), this candidate pattern is discarded (step 936) and is not added into the subset. The step 930 and the conditional steps 935, 936 are repeated until all the candidate patterns are examined (step 940). The step 920 is realizable by the steps 2.2 and 2.3 of the algorithm. The steps 935 and 936 are realizable by the steps 2.4.1 and 2.4.2, respectively, of the algorithm. As mentioned above, sorting of the candidate patterns by the step 920 has an advantage of ensuring that a maximum number of non-overlapped patterns is identified.

After the subset of the candidate patterns is obtained in the step 820, the subset of the candidate patterns is incorporated into the set of identified patterns in a step 825.

In a step 830, each of the touch points assigned to the individual identified pattern is validated by verifying if a touch point under consideration is one of the touch points identified in the step 710 and is enclosed by the point set of the individual identified pattern. The touch point under consideration is valid if it coincides with one touch point identified in the step 710 and is also enclosed by the point set. If the touch point under consideration is found to be invalid, this touch point is removed from the individual identified pattern. The step 830 is realizable by the step S3.1 of the algorithm.

In a step 832, it is to find out any identified pattern in the set of identified patterns to be invalid. As mentioned above, an invalid identified pattern has none or only one assigned anchor point that coincides with the touch points identified in the step 710. Based on findings of the step 832, any invalid identified pattern in the set of identified patterns is removed so as to purge the set of identified patterns in a step 835. The steps 832 and 835 are collectively realizable by the step S3.2.1 (including S3.2.1.1) of the algorithm.

The step 731 of incorporating the subset of the candidate patterns into the set of identified patterns includes the steps 820 and 825. The step 732 of purging the set of identified patterns of any invalid identified pattern includes the steps 830, 832 and 835. Although it is shown in FIG. 8 for illustrative purpose that the step 731 precedes the step 732 in execution order, other execution orders may be used since identified patterns newly introduced into the set of identified patterns in executing the step 731 are already valid while the step 732 is intended to remove invalid identified patterns only. It follows that the step 732 may precede the step 731 in execution.

Preferably the updating process further comprises a step 850 of finding out and repairing any incomplete identified candidate in the set of identified patterns. An incomplete identified pattern is defined to have only two anchor points coinciding with the touch points identified in the step 710. Note that the incomplete identified pattern has a missing anchor point. When the individual identified pattern is found to be incomplete, it is repaired by estimating a location of the missing anchor point from the two coinciding anchor points, viz, the aforementioned two anchor points of the individual identified pattern coinciding with the touch points identified in the step 710. The individual identified pattern after repairing is re-assigned with three anchor points. The step 850 is realizable by the step S3.2.2.1 of the algorithm.

It is preferable that the updating process further comprises a step 860 of computing or updating a geometry of the individual identified pattern in the set of identified patterns. The step 860 is executed after the steps 731 and 732 are performed. The geometry is computed or updated according to locations of the three anchor points of the individual identified pattern. As mentioned above, the geometry of the individual identified pattern comprises a reference point of the individual identified pattern on the touchscreen and an orientation of the individual identified pattern with respect to the touchscreen. The step 860 is realizable by the step S3.2.2.3.1 of the algorithm.

After the steps 731 and 732 are performed, it is preferable to allocate remaining touch points identified in the step 710 and not assigned as anchor points in the set of identified patterns to different identified patterns as information points according to respective point sets of the different identified patterns and locations of the remaining touch points (step 870). The step 870 is realizable by the step S4.1 of the algorithm.

After the remaining touch points are allocated in the step 870, it is preferable to update attributes of the individual identified pattern according to data received through any information point allocated to the individual identified pattern (step 875). An individual attribute may be any type of information conveyed from the one or more allocated information points. The step 875 is realizable by the step S4.2 of the algorithm.

Refer to FIG. 7. Optionally, a trajectory of the individual identified pattern is forecasted in a step 740 such that respective trajectories of on-screen icons tracking the objects are displayable on the touchscreen in advance for compensating for latency of the touchscreen. The step 740 is realizable by the step S5 of the algorithm. In the step 750, the step 740 is also repeated for the next time instant.

Figure 10:
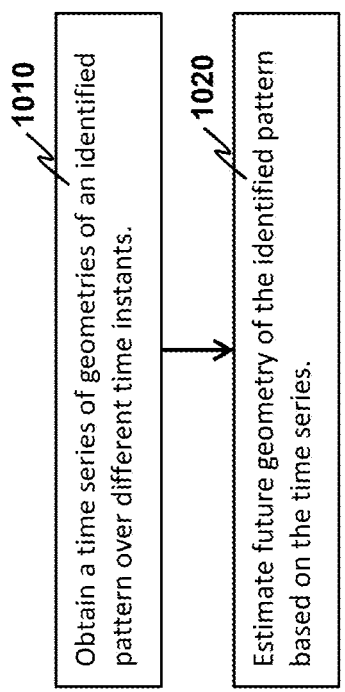
FIG. 10 depicts exemplary steps for forecasting a trajectory of each identified pattern in accordance with certain embodiments of the disclosed method.

FIG. 10 depicts exemplary steps for realizing the step 740. In forecasting the trajectory by the step 740, a time series of respective geometries of the individual identified pattern is obtained over a plurality of different time instants (step 1010). The plurality of different time instants includes the present time instant. A linear regression technique is used to estimate a future geometry of the individual identified pattern based on the time series of respective geometries of the individual identified pattern (step 1020). By estimating the future geometry, the trajectory of the individual identified pattern is forecasted. The linear regression technique may be a polynomial-based linear regression technique.

Figure 11:
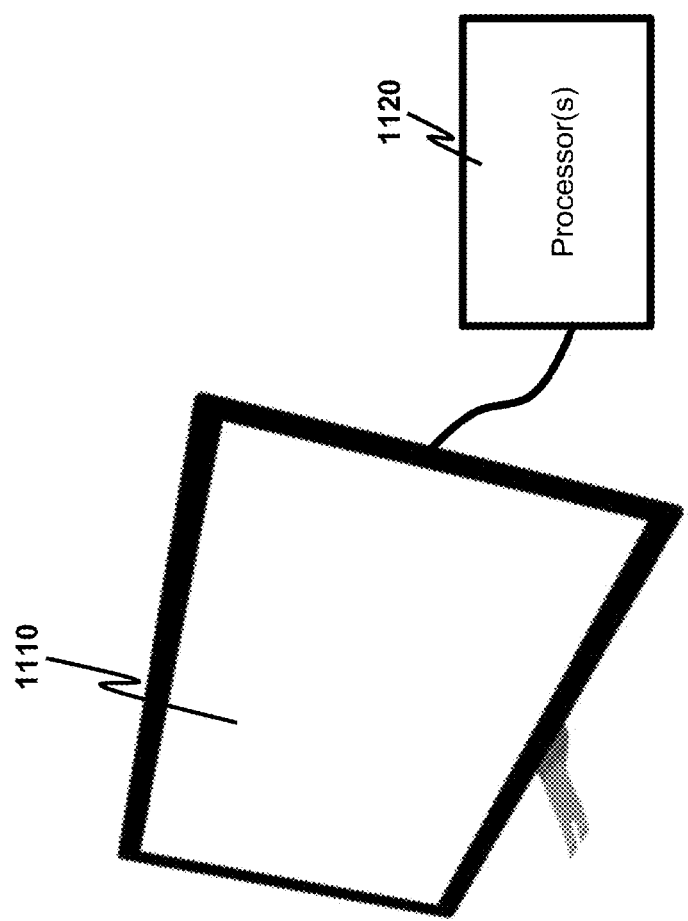
FIG. 11 depicts an apparatus used for implementing the disclosed method, where the apparatus includes a touchscreen and one or more processors.

The disclosed method is implementable on a computer system that includes the touchscreen. In some embodiments of the present disclosure, the computer system is realized as a single computing device. In certain practical applications, the computing device is implemented as a mobile computing device such as a tablet computer. FIG. 11 depicts an apparatus 1100 used for implementing the disclosed method. The apparatus 1100 comprises a touchscreen 1110 and one or more processors 1120. The touchscreen 1110 is controllable by the one or more processors 1120. It follows that the one or more processors 1120 are operable to configure the touchscreen 1110 to sense touches made by the objects, and to identify and locate the objects in accomplishing the step 710 of the disclosed method. In addition, the one or more processors 1120 are configured to execute a process for distinguishing and tracking multiple objects placed on the touchscreen 1110 according to any of the embodiments of the disclosed method.

The one or more processors 1120 may be, or may include, a touchscreen processor, which is a processor integrated into the touchscreen 1110. An individual processor may be realized by a microcontroller, a general-purpose processor, or a special-purpose processor such as an application specific integrated circuit (ASIC) or a digital signal processor (DSP), or by reconfigurable logics such as a field programmable gate array (FPGA).

Each of the embodiments of the disclosed method may be implemented in the apparatus 1100 by programming the one or more processors 1120. A program that results causes the one or more processor 1120 to execute the aforementioned process for distinguishing and tracking the multiple objects. The program may be stored in a non-transitory computer readable medium, such as an optical disk.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for distinguishing and tracking multiple objects placed on a touchscreen, an individual object being configured to generate imitated touches on the touchscreen, the method comprising the steps of:
   (a) identifying and locating touch points made on the touchscreen by the objects at a time instant;
   (b) finding out candidate patterns from locations of the touch points, wherein an individual candidate pattern includes three of the touch points forming a triangle congruent to a fingerprint triangle associated with a known predefined object in a set of predefined objects, said three of the touch points being regarded as three anchor points of the individual candidate pattern;
   (c) updating a set of identified patterns by an updating process according to the candidate patterns and the locations of the touch points identified in the step (a), wherein:
      an individual identified pattern is used for indicating a detected object on the touchscreen and is assigned with plural touch points generated by the detected object, the touch points assigned to the individual identified pattern including three anchor points for identifying the detected object; and
      the updating process comprises incorporating a subset of the candidate patterns into the set of identified patterns, wherein the subset is selected such that in the subset, each anchor point belongs to one and only one candidate pattern for avoiding a single anchor point from being shared by plural candidate patterns to thereby avoid an invalid case that the single anchor point is created by two or more physical objects;
   and
   (d) repeating processing steps for a next time instant, wherein the processing steps include the steps (a)-(c).

2. The method of claim 1, wherein the step (d) is executed such that in executing the step (b) for the next time instant, any touch point identified in the step (a) and coinciding with any assigned touch point in the set of identified patterns determined for the time instant is excluded from consideration in finding out the candidate patterns for reducing required computation and storage when compared to execution without a knowledge of the set of identified patterns.

3. The method of claim 1, wherein the updating process further comprises:
   purging the set of identified patterns of any identified pattern that is invalid, wherein an invalid identified pattern is defined to have no more than one anchor point coinciding with any of the touch points identified in the step (a).

4. The method of claim 3, wherein the updating process further comprises:
   creating a point set of the individual candidate pattern based on locations of the three anchor points of the individual candidate pattern, wherein the point set is a bounded area representing a size and an orientation of the known predefined object.

5. The method of claim 4, wherein the bounded area is a circle.

6. The method of claim 4, wherein the bounded area is a triangle, a quadrilateral or a polygon.

7. The method of claim 4, wherein the subset is selected by a selecting process comprising:
   initializing the subset to be a null set;
   sequentially examining the candidate patterns one by one to determine whether a candidate pattern under examination is invalid, wherein an invalid candidate pattern is defined such that any anchor point of the invalid candidate pattern is shared by any identified pattern in the set of identified patterns or by any candidate pattern already included in the subset; and
   responsive to finding that the candidate pattern under examination is not invalid, including the candidate pattern under examination into the subset.

8. The method of claim 7, wherein:
   in sequentially examining the candidate patterns, the candidate patterns are arranged in an ascending order of degrees of pattern overlapping, wherein a respective degree of pattern overlapping of the individual candidate pattern is computed by summing three numbers each being a total number of respective point sets that an individual anchor point of the individual candidate pattern is enclosed by.

9. The method of claim 4, wherein the purging of the set of identified patterns comprises:
   validating a respective touch point assigned to the individual identified pattern by verifying if the respective touch point is one of the touch points identified in the step (a) and is enclosed by the point set of the individual identified pattern; and
   responsive to finding that the respective touch point is invalid, remove the respective touch point from the identified pattern.

10. The method of claim 3, wherein the updating process further comprises:
- determining whether the individual identified pattern is incomplete where an incomplete identified pattern is defined to have only two anchor points coinciding with the touch points identified in the step (a) such that the incomplete identified pattern has a missing anchor point; and
- responsive to finding the individual identified pattern to be incomplete, estimating a location of the missing anchor point of the individual identified pattern from the two coinciding anchor points thereof such that the individual identified pattern is re-assigned with three anchor points.

11. The method of claim 4, wherein the updating process further comprises:
- after the incorporating of the subset into the set of identified patterns and after the purging of the set of identified patterns are performed, allocating remaining touch points identified in the step (a) and not assigned as anchor points in the set of identified patterns to different identified patterns as information points according to respective point sets of the different identified patterns and locations of the remaining touch points.

12. The method of claim 11, wherein the updating process further comprises:
- after the remaining touch points are allocated, updating attributes of the individual identified pattern according to data received through any information point allocated to the individual identified pattern.

13. The method of claim 3, wherein the updating process further comprises:
- after the incorporating of the subset into the set of identified patterns and after the purging of the set of identified patterns are performed, computing or updating a geometry of the individual identified pattern according to locations of the three anchor points of the individual identified pattern, wherein the geometry of the individual identified pattern comprises a reference point of the individual identified pattern on the touchscreen and an orientation of the individual identified pattern with respect to the touchscreen.

14. The method of claim 13 further comprising the step of:
(e) forecasting a trajectory of the individual identified pattern such that respective trajectories of on-screen icons tracking the objects are displayable on the touchscreen in advance for compensating for latency of the touchscreen;
wherein in the step (d), the processing steps further include the step (e).

15. The method of claim 14, wherein the trajectory of the individual identified pattern is forecasted by a forecasting process comprising:
- obtaining a time series of respective geometries of the individual identified pattern over a plurality of different time instants, wherein the plurality of different time instants includes the time instant; and
- using a linear regression technique to estimate a future geometry of the individual identified pattern based on the time series of respective geometries of the individual identified pattern such that the trajectory of the individual identified pattern is forecasted.

16. The method of claim 15, wherein the linear regression technique is a polynomial-based linear regression technique.

17. An apparatus comprising a touchscreen and one or more processors, the touchscreen being controllable by the one or more processors to sense touches made on the touchscreen, the one or more processors being configured to execute a process for distinguishing and tracking multiple objects placed on the touchscreen according to the method of claim 1, an individual object being configured to generate imitated touches on the touchscreen.

18. A non-transitory computer readable medium storing a program, wherein the program, when executed on one or more processors, causes the one or more processors to execute a process for distinguishing and tracking multiple objects placed on a touchscreen according to the method of claim 1, an individual object being configured to generate imitated touches on the touchscreen.

* * * * *